Apr. 3, 1923.
W. F. LANDGRAF
1,450,890
VALVE SPRING COMPRESSOR
Filed Oct. 29, 1921
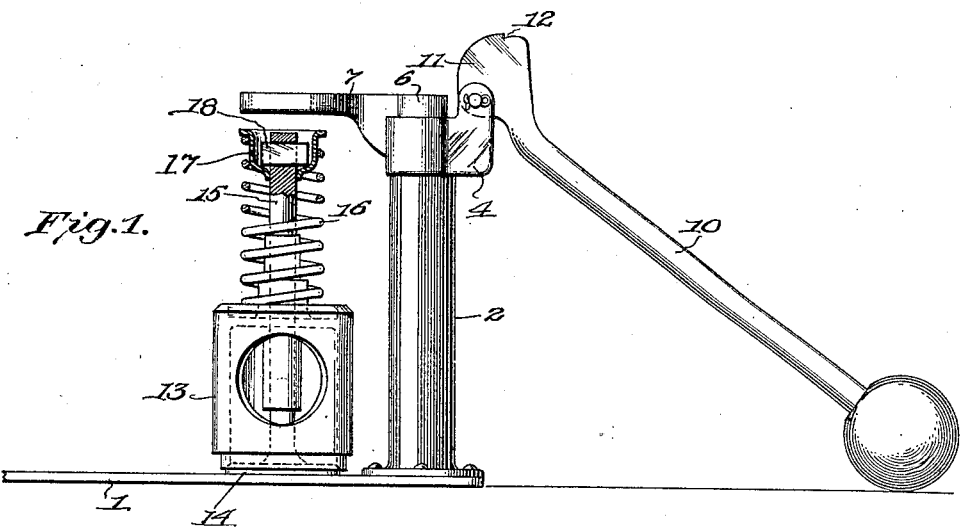
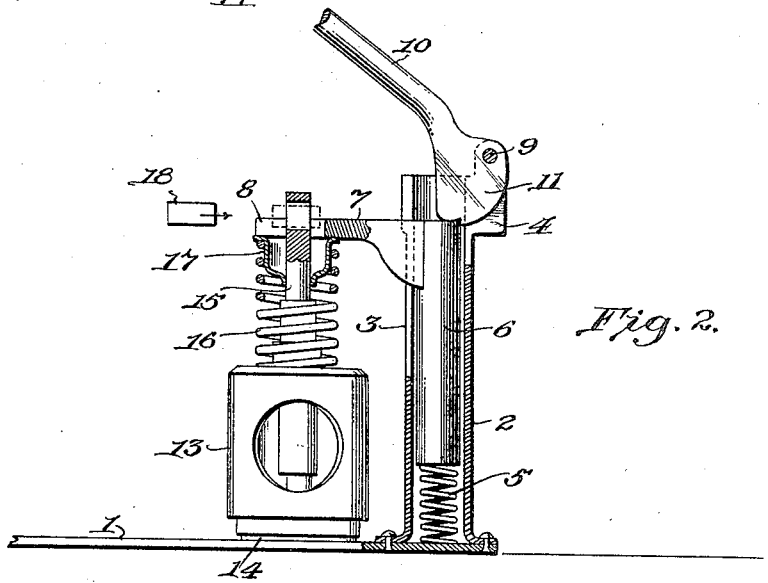
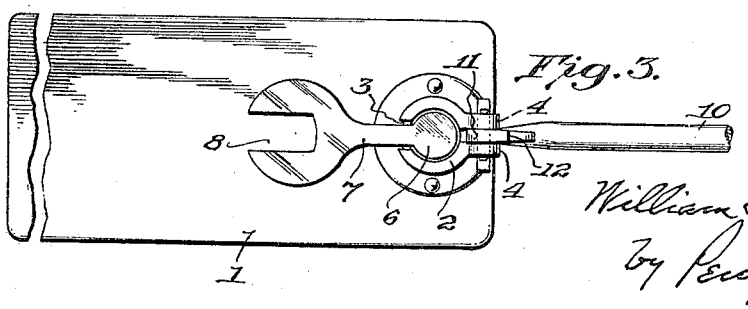
Inventor
William F. Landgraf
by Percy B. Hills
Attorney Patented Apr. 3, 1923.

1,450,890

UNITED STATES PATENT OFFICE.

WILLIAM F. LANDGRAF, OF WASHINGTON, DISTRICT OF COLUMBIA.

VALVE-SPRING COMPRESSOR.

Application filed October 29, 1921. Serial No. 511,314.

*To all whom it may concern:*

Be it known that I, WILLIAM F. LANDGRAF, a citizen of the United States, residing at Washington, District of Columbia, have invented certain new and useful Improvements in Valve-Spring Compressors, of which the following is a specification.

My invention relates to devices for facilitating the assembly and removal of coiled springs on valve stems, and has for its object to provide certain improvements in devices of this character as hereinafter more definitely will be pointed out and claimed, reference beeing had to the accompanying drawing, in which:—

Figure 1 is a side elevation of my improved device, showing a valve unit in position thereon ready for compression, the upper end of said valve unit being partly broken away.

Figure 2 is a similar view showing the device in compressing position, the main post of the same being shown in section.

Figure 3 is a top plan view of my improved device.

Similar numerals of reference denote corresponding parts in the several views.

In the said drawing, the reference numeral 1 denotes a base plate, to which is permanently fixed at one end in any suitable manner a hollow vertical post 2, the same being slotted for substantially half its length at one side at 3, and being provided at its opposite side with a pair of extending ears or lugs 4. Disposed within the post 2 at its bottom is a coiled spring 5, upon which loosely rests a plunger 6, having extending from its upper end at one side, and through the slot 3 in the post 2, a horizontal arm 7, bifurcated at 8 at its outer end. Pivoted at 9 between the ears 4 of the post 2 is a lever 10 having a rounded cam 11 at its inner end, the same being formed with a notch 12 near one extremity, for a purpose hereinafter to be described.

In operation, a valve unit comprising a cage 13, valve 14, valve stem 15, spring 16, and dished upper washer 17 engaged by a key 18 passing loosely through a keyway 19 in the upper end of the stem 15, is disposed on the plate 1 directly beneath the arm 7, the key 18 being in alinement with the slot 8 in said arm 7. Now by rotating the lever 10 to the left to the position shown in Figure 2, the cam 11 thereof will contact with and force down the plunger 6 against the tension of the spring 5, thereby bringing the parts to the position shown in Figure 2, which will compress the spring 16 of the valve assembly and force the washer 17 from its contact with the key 18, the washer being forced below said key as shown, so that the latter is free to be removed at will. In this position of the lever 10, the notch 12 in the cam 11 thereof will engage over the edge of the stem 6, as shown in Figure 2, thereby locking the parts in this position against any but positive manual displacement, and leaving both hands of the operator free.

While my device is adapted and intended for use with any type of valve assembly of this general character, it is particularly designed for use in connection with the valve assembly used in Buick motor cars, such a valve assembly being illustrated in the valve case 13 and its parts shown in the drawing.

Having thus fully described my invention, what I claim as new and desire to secure by Letters Patent, is:—

1. A spring compressing device, comprising a hollow vertical post, a spring loosely disposed in said post, a plunger vertically movable in said post and resting on said spring, a cam lever pivoted to said post in position to contact with and depress said plunger, and spring engaging means on said plunger.

2. A spring compressing device, comprising a hollow vertical post, a coiled spring loosely disposed in said post, a plunger vertically movable in said post, a cam lever pivoted to said post in position to contact with and depress said plunger, said cam lever being notched to engage and lock with said plunger when the latter is in its depressed position, and spring engaging means on said plunger.

3. A spring compressing device, comprising a base for supporting the spring assembly, a hollow vertical post fixed to said base, a coiled spring loosely disposed in said post, a plunger vertically movable in said post, a cam lever pivoted to said post in position to contact with and depress said plunger, said cam lever being notched to engage and lock with said plunger when the latter is in its depressed position, and spring engaging means on said plunger.

In testimony whereof, I hereunto affix my signature.

WILLIAM F. LANDGRAF.